2,828,332
Patented Mar. 25, 1958

2,828,332

PHOSPHONIUM COMPOUNDS

Van R. Gaertner, Dayton, Ohio, assignor to Monsanto Chemical Company, St. Louis, Mo., a corporation of Delaware No Drawing. Application August 23, 1955
Serial No. 530,210

2 Claims. (Cl. 260—505)

This invention relates to the reaction of sultones with tris(hydrocarbon)phosphines and to the products thereof.

It is an object of this invention to provide new phosphonium compounds. It is a further object of this invention to provide new phosphonium salts. Another object of this invention is to provide a process for reacting sultones with phosphines. A further object of this invention is to provide a process for the preparation of phosphonium sulfonate salts.

These and other objects of the present invention are provided by reacting a tris(hydrocarbon)phosphine with an alkanesultone. This reaction may be illustrated by the following equation:

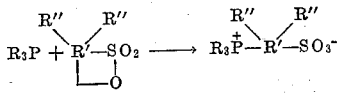

in which R is a hydrocarbon radical, R' is a hydrocarbon radical containing from 3 to 7 carbon atoms, and R" is selected from the class consisting of hydrogen and hydrocarbon radicals free of nonbenzenoid unsaturation and containing from 1 to 12 carbon atoms. The products of this reaction are tris(hydrocarbon)phosphoniumalkanesulfonates; they are internal ionic salts of the type generally designated as zwitterions.

The sultones employed in the preparation of the present invention are readily available compounds which may be prepared, e. g., by sulfochlorination of an organic halide, hydrolysis of the halogenated organic sulfonyl chloride thereby formed, and ring-closure of the hydrolysis product, with evolution of hydrogen halide, yielding the sultone. Whereas sultones are preferably named as derivatives of the corresponding hydroxy sulfonic acid, i. e.,

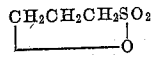

sultone of 3-hydroxy-1-propanesulfonic acid in an alternative system, they may be named simply as alkanesultones, i. e., propanesultone, butanesultone, etc. For example, by butanesultone is meant any one or more of the following isomers:

(1) 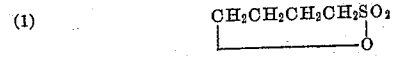

(2) 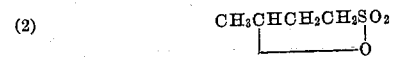

(3) 

(4) 

In this system, individual sultones may also be identified, if desired, by designating the point of attachment of the sultone group, e. g., δ-butanesultone designates the isomer marked (1) above.

In a preferred embodiment of the present reaction, sultones of the formula

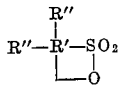

are used, where R' and R" are as defined hereinabove. These include, e. g., propanesultone, butanesultone, isooctanesultone, tert-dodecanesultone, n-hexadecanesultone, kerosenesultone, etc. As examples of specific useful sultones may be listed, e. g., alkanesultones such as the sultone of 3-hydroxy-1-propanesulfonic acid, the sultone of 4-hydroxy-2-methyl-2-butanesulfonic acid, the sultone of 5-hydroxy-1-pentanesulfonic acid, the sultone of 5-hydroxy-4-methyl-1-hexanesulfonic acid, the sultone of 6-ethyl-5-hydroxy-2-octadecanesulfonic acid, the sultone of 7,7-di-tert-butyl-4-hydroxy-1-octanesulfonic acid, the sultone of 4-hydroxy-1-hexadecanesulfonic acid, etc., and aralkane-, and cycloalkanesultones such as the sultone of 3-hydroxy-3-phenyl-1-propanesulfonic acid, the sultone of 3-hydroxycyclohexanesulfonic acid, etc.

Phosphines which may be used in the reaction of the present invention are compounds of trivalent phosphorus in which all of the three valence bonds of the phosphorus atom are attached to carbon atoms. They may be represented by the formula $R_3P$ where R represents a hydrocarbon radical. Among the tris(hydrocarbon)phosphines amenable to the present reaction and useful in the process of this invention are trialkylphosphines, triarylphosphines, mixed arylalkylphosphines, cycloalkylphosphines, and alkylenylphosphines. The tris(hydrocarbon)phosphines are readily prepared, for example, by reaction of Grignard reagents, i. e., hydrocarbon magnesium halides, with a phosphorus trihalide such as phosphorus trichloride, or with halophosphines such as hydrocarbondichlorophosphines. Further details of the preparation of tris(hydrocarbon)phosphines are set forth, for example, in a monograph by G. M. Kosolapoff, entitled "Organophosphorus Compounds" (New York, Wiley, 1950).

The readiness with which tris(hydrocarbon)phosphines undergo the reaction of the invention is related to the basicity of these compounds. Trialkylphosphines are highly basic compounds, and undergo the present reaction with particular facility. As examples of trialkylphosphines which may be used in the process of the invention may be listed, e. g., trimethylphosphine, triethylphosphine, tri-n-propylphosphine, triisopropylphosphine, triisobutylphosphine, tri-2-amylphosphine, trioctylphosphine, tridodecylphosphine, trihexadecylphosphine, etc., as well as mixed trialkyl phosphines such as ethyldimethylphosphine, diethylmethylphosphine, diethylpropylphosphine, diethylisoamylphosphine, ethyldiisopropylphosphine, di-n-butyldodecylphosphine, ethylisobutylisopropylphosphine, butylethylmethylphosphine, etc.

Alkenylphosphines which contain three hydrocarbon constituents on the central phosphorus atom are also useful in the present process. It is preferred that the olefinic bond in such compounds, for the purposes of the present invention, be removed from the phosphorus atom by at least one methylene group. Examples of such alkenylphosphines are triallylphosphine, tris-(2-methyl-2-propenyl)phosphine, tri-2-hexenylphosphine, diallylmethylphosphine, diallylethylphosphine, di-2-butenyl-n-butylphosphine, 4-pentenylethylhexadecylphosphine, etc.

Triarylphosphines, which are known to be substantially less basic than trialkylphosphines, are also susceptible to the present reaction and capable of forming salts with sultones in accordance with the process of this invention. Triarylphosphines which may be reacted with sultones by the present process include, e. g., triphenylphosphine, tri-o-tolylphosphine, tri-p-tolylphosphine, tri-2,4 - xylylphosphine, tris-(2,4,5-trimethylphenyl)phosphine, tri-1-naphthylphosphine, tri - 4 - biphenylylphosphine, biphenyl-di-o-tolylphosphine, diphenyl-o-tolylphosphine, phenyl-o-tolyl-p-tolylphosphine, 1 - naphthyldiphenylphosphine, etc. Another class of basic phosphines useful in the present process includes alkylarylphosphines such as methyldiphenylphosphine, dimethylphenylphosphine, dimethyl-p-tolylphosphine, dimethyl-(4-benzylphenyl)phosphine, dimethyl-3,4-xylylphosphine, diethylphenylphosphine, dipropylphenylphosphine, dipropyl-2,5-xylylphosphine, dibutylphenylphosphine, dibutyl-p-tolylphosphine, diamyl-2,5-xylylphosphine, etc.

Other classes of tris(hydrocarbon)phosphines capable of forming quaternary phosphonium sulfonates by the process of this invention includes cycloalkylphosphines such as cyclohexyldimethylphosphine, dicyclohexylmethylphosphine (4 - methylcyclohexyl) - diamylphosphine, etc.; aralkylphosphines such as tribenzylphosphine, benzyldiphenylphosphine, triphenethylphosphine, etc.; and cyclic phosphines such as 1,4-butylenylphenylphosphine, 1,5-pentylenyl-p-tolylphosphine, etc.

The products of the present reaction of alkanesultones with tris(hydrocarbon)phosphines are internal salts which may be named as phosphonium sulfonates; for example, by the reaction of trimethylphosphine with the sultone of 4-hydroxy-1-butanesulfonic acid, there is obtained 4 - (trimethylphosphonium)-1-butanesulfonate; similarly, there may be obtained, by reaction of trialkylphosphines with alkanesultones, e. g., 3-(trimethylphosphonium)-1-propanesulfonate, 3-(triethylphosphonium)-1 - propanesulfonate, 3-(triamylphosphonium)-1-propanesulfonate, 3 - (triisodecylphosphonium)-1-propanesulfonate, 3-(trimethylphosphonium)-1-butanesulfonate, 4- triisopropylphosphonium)-2-ethyl - 1 - butanesulfonate, 4-(tri-n-butylphosphonium)-1-butanesulfonate, 4-(diethylmethylphosphonium)-1-butanesulfonate, 4 - (methyldiethylphosphonium) - 2,3-dimethyl-1-heptanesulfonate, 5- (trimethylphosphonium) - 5,5-diamyl-2-dodecanesulfonate, 4-(diisoamylmethylphosphonium)-2-pentanesulfonate, etc. By reaction of alkenylphosphine compounds with alkanesultones, there are obtained such compounds as 3-(triallylphosphonium)-1-propanesulfonate, 4-(tri-3-pentenylphosphonium)-1-butanesulfonate, 4-(diallylethylphosphonium)-1-hexadecanesulfonate, etc.

Phosphonium sulfonate salts obtainable by the reaction of arylphosphines with alkanesultones in accordance with the present invention include, e. g., 4-(triphenylphosphonium)-1-butanesulfonate, 3-(tri - p - tolylphosphonium)-1-butanesulfonate, 3 - (dicumyl-p-tolylphosphonium)-1-propanesulfonate, 4 - (tri - 1 - naphthylphosphonium)-1-tert-dodecanesulfonate, 3 - (dibutylphenylphosphonium)-2-phenyl-1-propanesulfonate, 4 - (diisoamyl-2,5-xylylphosphonium) - 1 - pentanesulfonate, 4-(diphenylpropylphosphonium)-3-ethyl - 1 - hexadecanesulfonate, 5-(1-naphthyl-di - 3 - pentenylphosphonium)-2-dodecanesulfonate, 4 - (diallylphenylphosphonium)-1-butanesulfonate, etc.

Similarly, by reaction of aralkylphosphines with alkanesultones, there are prepared such compounds as 3-(tribenzylphosphonium)-1-propanesulfonate, 3 - (triphenethylphosphonium)-2-phenyl - 2 - butanesulfonate, 4-(dibenzylmethylphosphonium) - 1 - hexadecanesulfonate, 4-(duryl-di-p-tolylphosphonium)-1-butanesulfonate, etc.

Cycloalkylphosphines reacted with alkanesultones by the process of this invention give, e. g., 4-(cyclohexyldiisoamylphosphonium)-1-butanesulfonate, 3 - (tricyclopentylphosphonium)-1-propanesulfonate, 4 - (cyclohexylethylpropylphosphonium)-1-dodecanesulfonate, etc.

Examples of phosphonium sulfonate salts preparable by the present process via the reaction of cyclic phosphines, i. e., alkylenylphosphines, include, e. g., 3-(1,4-butylenylmethylphosphonium) - 1 - propanesulfonate, 4-(1,4-butylenylethylphosphonium) - 1 - butanesulfonate, etc.

In preparing the tertiary esters of the invention, I prefer to operate substantially as follows:

The tris(hydrocarbon)phosphine is contacted with the sultone until reaction is complete. The temperature at which this reaction takes place will depend on the reactivity of the components; for example, the trialkyl phosphines are more reactive than the triarylphosphines, in general, and thus will react at lower temperatures. If heat is applied to accelerate the reaction, a convenient temperature is the reflux temperature of the reaction mixture; maximum temperatures are temperatures which are below the decomposition point of the reactants. Atmospheric pressure is generally satisfactory for the present reaction, though super- or subatmospheric pressures may be employed if desired. Solvents or diluents are usually not required, but may, with advantage, be included, e. g., to facilitate stirring. Suitable solvents are any inert hydrocarbon compounds such as benzene, hexane, petroleum distillation fractions, dioxane, etc.

Generally, equimolecular amounts of the tris(hydrocarbon)phosphine and of the sultone will be reacted together, but, if desired, an excess of the more readily available component may be used in order to maximize utilization of the less readily available component. Any unreacted sultone or phosphine is readily removed at the end of the reaction, e. g., by extraction, distillation, etc. Either the sultone and the phosphine may be mixed all at once and then, if necessary, heat applied, or one of the reactants may be added gradually to the other. Reaction is generally complete within from a few minutes to several hours.

The products of this reaction are well-characterized, usually water-soluble, stable salts which range from crystalline materials to viscous liquids. They are useful for a variety of chemical and agricultural applications; for example, they may be used as surfactants or as biological toxicants, e. g., as moth-proofing agents and as insecticides, bactericides, herbicides, fungicides, nematocides, etc.

The invention is further illustrated, but not limited, by the following examples:

*Example 1*

A homogenous mixture of 10.5 grams (0.040 mole) of triphenylphosphine and 5.0 grams (0.041 mole) of γ-propanesultone in 100 ml. of xylene was stirred and gradually heated to reflux temperature (about 135° C.), after which the mixture was refluxed for 3 hours. During the reaction an oily gum was observed to separate and solidify on the walls of the flask. At the end of 3 hours, the mixture was cooled, whereupon the oil which had separated partially crystallized. The supernatant xylene layer was then decanted and the solid material was rinsed with xylene and then stirred with isopropanol. The crystalline product was filtered off, washed once more with isopropanol, and dried in vacuum, giving 5.6 grams of white dry crystals of 3-(triphenylphosphonium)-1-propanesulfonate. The crystals were readily soluble in water and somewhat less soluble in ethanol. The phosphonium sulfonate compound sinters (with some discoloration) at 299° C. and melts at 310–16° C. On analysis of the compound, the following results were obtained:

| | Found | Calculated for $C_{21}H_{21}O_3PS$ |
|---|---|---|
| Percent C | 65.73 | 65.6 |
| Percent H | 5.56 | 5.51 |
| Percent P | 7.60 | 8.06 |

*Example 2*

To a mixture of 30.4 grams (0.1 mole) of δ-hexadecanesultone and 100 ml. of toluene are added gradually, drop by drop, 7.6 grams (0.1 mole) of trimethylphosphine. When the addition is complete, the mixture is gently refluxed on a water bath for a half hour. The product 4-(trimethylphosphonium)-1-hexadecanesulfonate is light-colored and water-soluble.

*Example 3*

Tribenzylphosphine and δ-butanesultone are dissolved in xylene and reacted as described in Example 1. The crystals which separate from the reaction mixture on cooling are isolated by decanting, washing with xylene and butanol, and recrystallizing from butanol. The 4-(tribenzylphosphonium)-1-butanesulfonate thus obtained is a high-melting, water-soluble solid.

Application of the present compounds as moth-proofing agents is illustrated by the following example:

*Example 4*

Five parts of the 3-(triphenylphosphonium)-1-propanesulfonate of Example 1 are dissolved in 95 parts of alcohol. This solution is applied to woolen material at a rate of about 5 percent by weight of salt per weight of wool cloth, by dipping the cloth in the solution, centrifuging, then drying. The woolen goods are free from attack by moth larvae.

Further modifications and adaptations of the invention herein disclosed will readily occur to those skilled in the art.

What is claimed is:
1. A compound of the formula

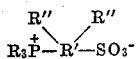

wherein R is a hydrocarbon radical containing not more than 16 carbon atoms selected from the class consisting of alkyl, aryl, aralkyl and cycloalkyl radicals, R' is a saturated straight-chain aliphatic hydrocarbon radical selected from the class consisting of 3 and 4 carbon atoms to separate the phosphorus and sulfur atoms and R" is selected from the class consisting of hydrogen and alkyl, aryl, aralkyl and cycloalkyl hydrocarbon radicals having not more than 12 carbon atoms.

2. 3-(triphenylphosphonium)-1-propanesulfonate.

References Cited in the file of this patent

UNITED STATES PATENTS 1,921,364     Lommel et al. _____ Aug. 8, 1933

FOREIGN PATENTS 743,570     Germany _____ Apr. 22, 1954

OTHER REFERENCES

Helberger et al.: Ann. der Chemie, 565, p. 22–35 (1949).